United States Patent [19]

Vesely

[11] 3,972,990

[45] Aug. 3, 1976

[54] METHOD OF PREPARING LOW DENSITY-HIGH MICROPORE VOLUME REFRACTORY INORGANIC OXIDE PARTICLES

[75] Inventor: Kenneth D. Vesely, Arlington Heights, Ill.

[73] Assignee: Universal Oil Products Company, Des Plaines, Ill.

[22] Filed: May 30, 1975

[21] Appl. No.: 582,525

[52] U.S. Cl. ............................. 423/628; 423/630; 423/631; 252/448; 264/15
[51] Int. Cl.² ............................................ C01F 7/02
[58] Field of Search .......... 423/625, 628, 630, 631; 264/15; 252/448

[56] References Cited
UNITED STATES PATENTS

| | | | |
|---|---|---|---|
| 3,027,234 | 3/1962 | Michalko | 423/630 |
| 3,346,336 | 10/1967 | Hayes | 423/628 |
| 3,382,040 | 5/1968 | Fuderer | 423/625 |
| 3,416,888 | 12/1968 | Notari | 423/628 |
| 3,907,512 | 9/1975 | Zugenheim et al. | 423/678 |

*Primary Examiner*—Herbert T. Carter
*Attorney, Agent, or Firm*—James R. Hoatson, Jr.; Robert W. Welch; William H. Page, II

[57] ABSTRACT

A method of preparing spheroidal refractory inorganic oxide particles characterized by low bulk density in combination with high micropore volume is disclosed. The particles, especially low bulk density - high micropore volume alumina particles, are useful as a support or carrier material for catalytically active materials to yield an improved hydrocarbon conversion catalyst.

10 Claims, No Drawings

METHOD OF PREPARING LOW DENSITY-HIGH MICROPORE VOLUME REFRACTORY INORGANIC OXIDE PARTICLES

It is an object of this invention to present a novel method for the preparation of spheroidal refractory inorganic oxide particles of low bulk density and high micropore volume. It has been recognized that spheroidal particles offer numerous advantages when employed as a catalyst or as a support for catalytic materials. For example, when disposed in a fixed bed, spherical particles permit a more uniform packing and lessen the tendency of reactant streams to channel through the bed out of effective contact with the catalyst. When employed in a moving bed type of operation, spheroidal particles have a further advantage in that there are no sharp edges to break or wear off with a tendency to plug process equipment.

Low density-high micropore volume refractory inorganic oxides, notably alumina, exhibit improved activity when employed as a catalyst, or as a catalyst support or carrier material. Spheroidal, low density-high micropore volume alumina particles are especially useful as a support or carrier material for a platinum group metal component, alone or in combination with one or more promoter metals, to yield an improved catalyst for reforming — the reforming of gasoline boiling range feed stocks to improve the octane rating thereof being a process well known to the petroleum industry.

The pore volume of refractory inorganic oxides utilized as a catalyst, or as a catalyst support or carrier material, is typically expressed in terms of pore size distribution, that is, in terms of the pore volume attributable to macropores and the pore volume attributable to micropores. As herein contemplated, micropores are those pores having an average diameter of less than about 600 Angstroms as determined from the adsorption isotherm for nitrogen at liquid nitrogen temperatures and at a relative pressure $(P/P_0)$ of 0.97. The micropore volume will then consist of that portion of the total pore volume attributable to pores of less than about 600 Angstroms, and the macropore volume will be the difference between the total pore volume and the micropore volume. The total surface area of the refractory inorganic oxide particles is a function of the micropore volume, substantially all of said surface area being associated with pores of less than about 600 Angstroms in diameter.

The method of this invention is directed to the preparation of refractory inorganic oxide particles characterized by an average bulk density of from about 0.1 to about 0.6 grams per cubic centimeter, with from about 0.7 to about 5.0 cubic centimeters per gram of the total pore volume being associated with pores having an average diameter of less than about 600 Angstroms.

In one of its broad aspects, the present invention embodies a method of preparing low density refractory inorganic oxide spheres characterized by a relatively high micropore volume which comprises effecting the gelation of a hydrosol precursor of the said refractory inorganic oxide by dispersing said hydrosol, commingled with an ammonia precursor, in a hot oil bath at a temperature effecting decomposition of said ammonia precursor and gelation of said hydrosol; washing the resulting hydrogel spheres with a water-alcohol solution; evaporating the water-alcohol solution from said spheres at a reduced pressure and at a temperature substantially equivalent to the boiling point of said alcohol-water solution at said pressure; further drying said spheres in a substantially water-free atmosphere to produce spheres characterized by less than about 10 wt. % loss on ignition at 900° C.; and calcining the dried spheres at a temperature of from about 425° to about 750° C. in a substantially water-free atmosphere.

Other objects and embodiments of this invention will become apparent in the following detailed specification.

The hydrosols herein contemplated particularly include alumina hydrosols, but also zirconia, silica, chromia and magnesia hydrosols and the like, which are gellable to form the corresponding hydrogel and ultimately, upon calcination, the corresponding refractory inorganic oxide. Said hydrosols are such as are prepared by the general method whereby an acid salt of an appropriate metal is hydrolyzed in aqueous solution and the solution treated at conditions to reduce the acid anion concentration thereof, as by neutralization. The resulting olation reaction yields inorganic polymers of colloidal dimension dispersed and suspended in the remaining liquid. For example, an alumina hydrosol can be prepared by the hydrolysis of an acid salt of aluminum, such as aluminum chloride, in aqueous solution, and treating said solution at conditions to reduce the resulting chloride anion concentration thereof, as by neutralization, to achieve an aluminum/chloride anion ratio of from about 1:1 to about 1.5:1. Reduction in the acid anion concentration may be accomplished in any conventional or otherwise convenient manner. Thus, the acid anion concentration can be reduced by utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired anion deficiency is created simply by heating. Another method of producing a suitable alumina hydrosol is in the electrolysis of an aluminum salt solution, for example an aqueous aluminum chloride solution, in an electrolytic cell having a porous partition between the anode and the cathode whereby an acid anion deficiency is effected in the cathode compartment with the formation of an alumina hydrosol therein.

Preferably, the alumina hydrosol is an aluminum chloride hydrosol, variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C. and reducing the chloride anion concentration of the resulting aluminum chloride solution by the device of maintaining an excess of the aluminum reactant in the reaction mixture as a neutralizing agent. In any case, the aluminum chloride hydrosol is prepared to contain from about 10 to about 14 wt. % aluminum in from about a 1:1 to about a 1.5 ratio with the chloride anion content thereof.

One preferred method of forming the hydrosol into spheroidal hydrogel particles is in the gelation of said hydrosol in accordance with the oil drop method. In accordance with the oil drop method, the hydrosol is dispersed as droplets in a hot oil bath whereby gelation occurs with the formation of spherical hydrogel particles. In this type of operation, the hydrosol is set chemically utilizing ammonia as a neutralizing or setting agent. Usually, the ammonia is furnished by an ammonia precursor which is included in the hydrosol. The precursor is suitably hexamethylenetetramine, or urea, or mixtures thereof, although other weakly basic materials which are substantially stable at normal temperatures but hydrolyzable to form ammonia with increasing temperature, are suitably employed. Hexamethylenetetramine utilized in from about a 1:4 to about a 2:4 mole ratio with the acid anion contained in said mixture is a preferred ammonia precursor. Only a fraction of the ammonia precursor is hydrolyzed or decomposed in the relatively short period during which initial gelation occurs. During the subsequent aging process, frequently referred to as basic aging, the residual ammonia precursor retained in the spheroidal particles continues to hydrolyze and effect further polymerization of the alumina hydrogel whereby desirable pore characteristics are established. Basic aging of the hydrogel is suitably accomplished over a period of from about 0.5 to about 24 hours, preferably in the oil suspending medium, at a temperature of from about 60° to about 150° C. or more, and at a pressure to maintain the water content of the hydrogel spheres in a substantially liquid phase.

The oil drop method affords a convenient means of promoting those physical characteristics of the refractory inorganic oxide which are desirable in a support or carrier material for catalytically active metallic components. The method involves a number of process variables which affect both the density and the pore volume of the spheroidal gel product. Generally, the metals/acid anion ratio of the sol will influence the crystallization process and the average bulk density of the spheroidal gel particles — higher ratios tending to give particles of lower average bulk density. Other process variables, including the time, temperature and pH at which the particles are aged, are effective to establish crystallite size and the pore volume attendant therewith. Usually, temperatures in the higher range and longer aging periods result in lower average bulk densities.

Pursuant to the method of this invention, the aged hydrogel spheres are washed one or more times with a water-miscible alcohol, the water-alcohol solution being subsequently evaporated from the spheres at a reduced pressure and at a temperature substantially equivalent to the boiling of said alcohol-water solution at said pressure. Suitable alcohols include methyl alcohol, ethyl alcohol, n-propyl alcohol, isopropyl alcohol, t-butyl alcohol, and the like. A particularly suitable method of washing the hydrogel spheres is by percolating the alcohol through the spheres at a temperature of from about 20° to about 50° C. until the effluent alcohol is substantially free of acquired water, that is, until the alcohol no longer picks up water from the hydrogel spheres. In any case, the washed spheres are subsequently dried at a reduced pressure, say from about 300 to about 600 millimeters of Hg, at a temperature substantially equivalent to the boiling point of said alcohol at said pressure. In one preferred embodiment of this invention, alumina hydrogel spheres are washed with ethyl alcohol and thereafter dried at a pressure of from about 300 to about 600 millimeters of Hg, and at a temperature of from about 50° to about 100° C. In any case, the spheres are further dried in a substantially water-free atmosphere until said spheres exhibit less than about a 10% loss in weight when subjected to ignition at 900° C., and the dried spheres are subsequently calcined, again in a substantially water-free atmosphere, at a temperature of from about 425° to about 750° C.

The calcined spherical particles are useful per se or impregnated with other catalytic components. In particular, the particles are useful as a support or carrier material for a platinum group component alone or in combination with a tin component, a rhenium component and/or a germanium component to yield an improved reforming catalyst. The platinum group component is suitably composited with a support or carrier material by impregnation and/or ion-exchange techniques familiar with the art. For example, a soluble platinum group compound, that is, a soluble compound of platinum, palladium, rhodium, ruthenium, osmium and/or iridium is prepared in aqueous solution, and the alumina, or other refractory inorganic oxide particles, soaked, dipped, or otherwise immersed therein. Suitable platinum group compounds include platinum chloride, chloroplatinic acid, ammonium chloroplatinate, dinitrodiamino-platinum, palladium chloride, and the like. It is common practice to impregnate the support or carrier material with an aqueous chloroplatinic acid solution acidified with hydrochloric acid to facilitate an even distribution of platinum on the support or carrier material. The support or carrier material is preferably maintained in contact with the impregnating solution at ambient temperature conditions, suitably for at least about 30 minutes, and the impregnating solution thereafter evaporated to dryness. For example, a volume of the particulate support or carrier material is immersed in a substantially equal volume of impregnating solution in a jacketed rotary dryer and tumbled therein for a brief period at about room temperature. Steam is thereafter applied to the dryer jacket to expedite evaporation of the impregnating solution and recovery of substantially dry impregnated particles. The tin, rhenium and/or germanium components can be composited with the support or carrier material in any conventional or otherwise convenient manner. Suitable methods include impregnation and/or ion-exchange of the support or carrier material with a suitable compound of one or more of said components in any desired sequence, with or without intermediate calcination. In the impregnation of the support or carried material, it is a preferred practice to impregnate one or more of said components on said support or carrier simultaneously with the platinum group component from a common impregnating solution. For example, when the added component is tin, stannic chloride is conveniently and advantageously prepared in common solution with chloroplatinic acid, the concentration of each component therein being sufficient to yield a catalyst product containing from about 0.01 to about 2.0 wt. % platinum and from about 0.1 to about 5.0 wt. % tin calculated as the elemental metals. Similarly, when the desired added component is rhenium, perrhenic acid and chloroplatinic acid can be prepared in a common aqueous solution to impregnate the support or carrier material, suitably with from about 0.01 to about 2.0 wt. % platinum and from about 0.01 to about 2.0 wt. % rhenium.

The following example is presented in illustration of the method of this invention and is not intended as an undue limitation on the generally broad scope of the invention as set out in the appended claims.

EXAMPLE I

In the preparation of low density - high micropore volume alumina spheres, a sufficient quantity of aluminum pellets is initially digested in dilute hydrochloric acid under reflux conditions, about 102° C., to provide a hydrosol containing about 10 wt. % aluminum in a 1.15:1 ratio with the chloride anion content thereof. The hydrosol is thereafter cooled to about 6° C. and admixed with a 28% aqueous hexamethylenetetramine solution sufficient to provide a hydrosol containing about 12 wt. % hexamethylenetetramine. The hydrosol is then dispersed as droplets in a gas oil suspending media maintained in a column at about 95° C. The resulting hydrogel spheres are allowed to age for about 24 hours in a hot oil media and thereafter separated from the oil. The aged spheres are thereafter treated in a wash column, absolute alcohol being percolated through the spheres for about 1 hour. The wash column is then evacuated to about 600 millimeters of mercury and heated at approximately 93° C. for 1 hour. Further drying is effected for about 1 hour at 400° C. in the flow of substantially dry air, the dried spheres being subsequently calcined in substantially dry air for 2 hours at 650° C. The spheroidal alumina product is characterized by an average bulk density of from about 0.1 to about 0.6 grams per cubic centimeter, in a micropore volume of from about 0.7 to about 5.0 cubic centimeters per gram.

I claim as my invention:

1. A method of preparing spherical particles of alumina having an average bulk density of from about 0.1 to about 0.6 grams per cubic centimeter, with from about 0.7 to about 5.0 cubic centimeters per gram of the total pore volume being associated with pores having an average diameter of less than about 600 Angstroms, said method comprising the steps of:
   a. effecting the gelation of a hydrosol of said alumina in admixture with ammonia in a hot oil bath to form hydrogel spheres;
   b. percolating a water-miscible alcohol through said hydrogel spheres at a temperature of from about 20° to about 50° C. until the effluent alcohol is substantially free of acquired water;
   c. thereafter evaporating the resulting wateralcohol solution from the hydrogel spheres at a pressure of from about 300 to about 600 millimeters of mercury and at a temperature substantially equivalent to the boiling point of said alcohol-water solution at said pressure;
   d. further drying said spheres in a substantially water-free atmosphere to produce spheres characterized by less than about 10 wt. % loss on ignition at 900° C.; and
   e. calcining the dried spheres at a temperature of from about 425° to about 750° C. in a substantially water-free atmosphere.

2. The method of claim 1 further characterized with respect to step (a) in that said hydrosol is an acidic alumina hydrosol containing from about 10 to about 14 wt. % aluminum in from about a 1:1 to about a 1.5:1 ratio with acid anion content thereof.

3. The method of claim 2 further characterized with respect to step (a) in that said ammonia is derived from hexamethylenetetramine utilized in an amount to effect substantially complete neutralization of the acid anion contained in said mixture.

4. The method of claim 2 further characterized with respect to step (a) in that said ammonia is derived from hexamethylenetetramine utilized in from about a 1:4 to about a 2:4 mole ratio with the acid anion contained in said mixture.

5. The method of claim 1 further characterized with respect to step (a) in that said ammonia is derived from hexamethylenetetramine.

6. The method of claim 1 further characterized with respect to step (a) in that said hydrosol is an aluminum hydroxyhalide sol.

7. The method of claim 1 further characterized with respect to step (a) in that said oil bath is maintained at a temperature of from about 50° to about 105° C.

8. The method of claim 1 further characterized with respect to step (b) in that said alcohol wash is effected at a temperature of from about 20° to about 50° C. and at a pressure to maintain substantially liquid phase aging conditions.

9. The method of claim 1 further characterized with respect to step (b) in that said alcohol is ethyl alcohol.

10. The method of claim 1 further characterized with respect to step (c) in that said water-alcohol solution is evaporated at a reduced pressure of from about 5 to about 10 psig and at a temperature of from about 10° to about 50° C.

* * * * *